Aug. 30, 1966  W. P. DUNCAN ETAL  3,269,440
METHOD OF FABRICATING WOODEN GUTTERS
Filed March 15, 1965
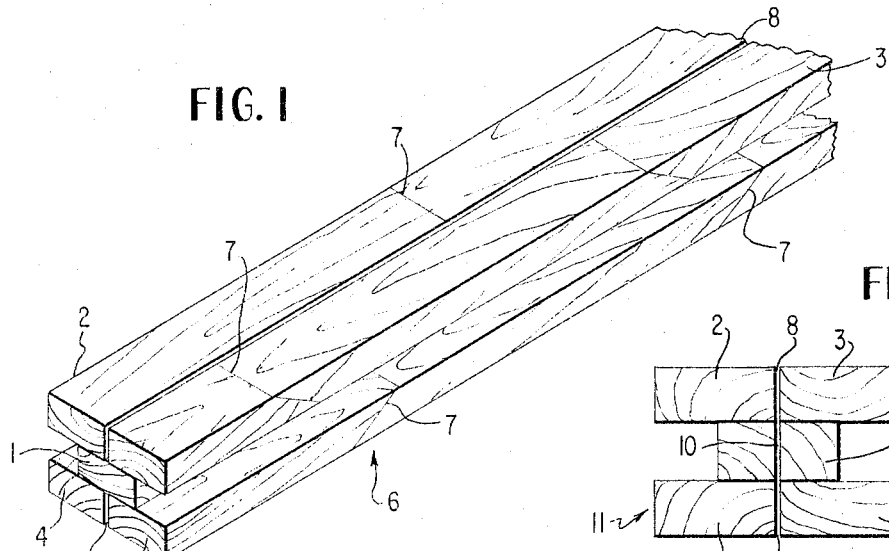
FIG. 1
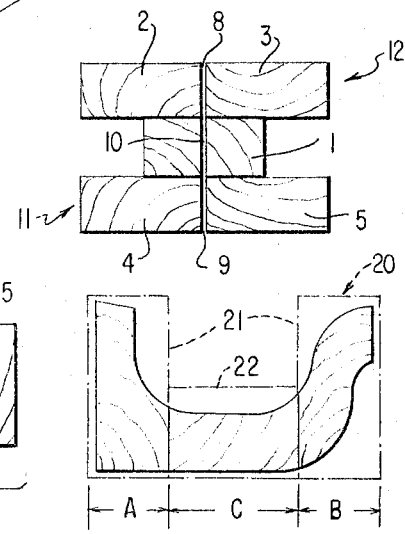
FIG. 2
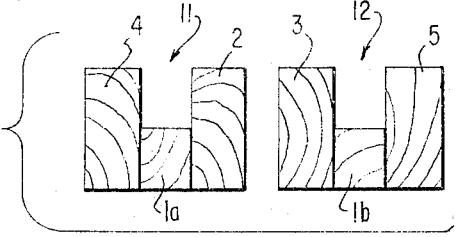
FIG. 3
FIG. 5
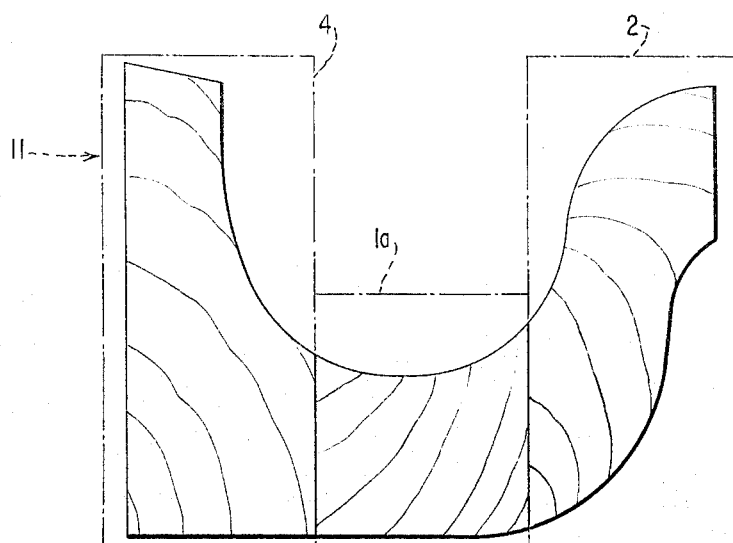
FIG. 4
INVENTORS.
WILLIAM P. DUNCAN
PAUL G. ERICSON
BY
ATTORNEY.

United States Patent Office 3,269,440
Patented August 30, 1966

3,269,440
METHOD OF FABRICATING WOODEN GUTTERS
William P. Duncan, 11309 2nd Ave. NW., Seattle, Wash., and Paul G. Ericson, 13702 8th Ave. E., Sumner, Wash.
Filed Mar. 15, 1965, Ser. No. 439,615
9 Claims. (Cl. 144—316)

The present invention relates to wooden gutters, of the type associated with the eaves of buildings to receive and conduct away rail water shed by the building roof, and more particularly the invention provides a novel and useful new method of fabricating such gutters.

The principal objects of the invention are to enhance the quality and lower the cost of such gutters.

An important related object is concerned with utilizing inexpensive and abundant materials not heretofore capable of being used in the production of wooden gutters, thus substantially reducing the cost of the finished product.

Another object is to provide a method of fabricating which permits the gutters to be made continuously in dimensions of heretofore unattainable cross-sectional size as well as length.

Other objects are to provide a method of the character indicated that can be practiced without the exercise of any inordinate degree of skill, by relatively inexperienced labor operating conventional and readily available equipment, that will provide an outlet and use for short lengths of standard dimension lumber that can be obtained in good quality at much less cost than the integral unitary lengths of larger cross section required in practice of the prior art methods, that will eliminate much of the material waste and much of the shaping operation heretofore required, and which in general will improve the final product in respect of appearance, durability and economy.

These and other objects and advantages, most of which will be evident to those skilled in the art as the description of the invention proceeds, are attained by the method which is illustrated by the accompanying drawing forming part of this application for letters patent, in which FIGURE 1 is an isometric view of the initial assembly of lumber pieces formed by the first step in the practice of the new method;

FIG. 2 is an end elevational view of the assembly of FIG. 1 after the cutting operation that forms the second step in the method;

FIG. 3 is an end view of the two blanks into which the cutting operation divide the assembly;

FIG. 4 is an end view, on a relatively enlarged scale, of a gutter as formed by the final shaping operation practiced on one of the blanks of FIG. 3; and FIG. 5 is a similar view, on a smaller scale, of a gutter final product of different dimensions and proportions, included to illustrate the versatility of the method and its adaptability to materials of different sizes and shapes to produce gutters of different styles, sizes, capacities, etc.

Generally speaking, the invention comprises bonding together pieces of lumber in standard framing sizes to form a three-layer assembly of H-shape in cross section, i.e., with a relatively narrow central web sandwiched between two outer flange layers of mutually equal greater width, and then dividing the assembly along a longitudinal central plane into two identical blanks of U-shaped cross section, each blank being a channel having a bottom formed of half of the web layer of the original assembly and having front and rear flanges each formed of half of one of the flange layers of the original assembly, and finally trimming and dressing the blanks by a milling operation or the equivalent into desired final gutter shape.

In the accompanying drawing, the reference numerals 1, 2, 3, 4 and 5 designate five separate but identical pieces of lumber of rectangular cross section in some standard framing size, such as two by four inches. Actually the dimensions of this standard lumber product, universally designated 2 x 4, are $1^{11}/_{16}$ x $3^{11}/_{16}$" when dressed. The five pieces are assembled in the manner shown in FIG. 1, with piece 1 sandwiched centrally between pieces 2 and 3 set side by side on the top surface of piece 1 and symmetrically thereof, and with pieces 4 and 5 similarly set side by side on the bottom surface of piece 1, so that the resulting three-layer assembly is of H-shape in cross section.

The pieces are bonded together by adhesive means, specifically and preferably by coating both the wide surfaces of piece 1 with a waterproof wood glue, such as a resorcinol resin adhesive, then applying a similar coating to approximately half of one of the wide surfaces of each of the other four pieces, i.e., to the areas thereof which will engage the coated surfaces of piece 1, and then clamping the assembly securely together in the relationship shown in FIG. 1 until the glue sets.

In order to produce the assembly of FIG. 1, designated generally 6, in long or indefinite length independent of the lengths of the individual pieces used, each of the five pieces may be fabricated of a plurality of components of random length glued together endwise, preferably by scarf joints as shown at 7 in FIG. 1. In this manner it is possible to produce a long assembly 6 very economically out of short pieces which may even be of substantially scrap material. If, as is preferred, the joints 7 are well staggered, the asesmbly is entirely comparable in structural strength with any assembly made entirely of five integral pieces, besides being superior in respect of straightness and resistance to warping.

It is preferable to space the pieces 2 and 3 approximately $\frac{1}{8}$ inch apart as shown at 8, and to space the pieces 4 and 5 similarly as shown at 9, with the spaces 8 and 9 aligned in the same vertical plane bisecting the central piece 1.

The assembly 6 thus completed, with the glue well set, is divided centrally longitudinally into two identical halves, as by passing a saw blade through the spaces 8 and 9 while making a cut 10 in the center plane of the center piece 1, as shown in FIG. 2.

This produces, from the single assembly 6, a pair of identical blanks 11 and 12, as shown in FIG. 3, each of trough or channel shape, the blank 11 having a bottom or web consisting of one half of the original piece 1, designated 1a, and having flanges consisting of the pieces 4 and 2, and the other blank, designated 12, having a bottom or web consisting of the half 1b, of the original piece 1 and flanges consisting of the pieces 3 and 5.

Each of these blanks is now milled or otherwise treated in a conventional, well known type of shaping operation to reduce it to the style and form of the finished gutter desired. FIG. 4 illustrates the transition from the original broken line cross section of the blank 11 to the final cross section shown in full lines. As there seen, the pieces 4 and 2 are trimmed down to the outer and inner surface contours desired for the back and front flanges of the finished gutter and the web piece 1a is trimmed into continuous curvature with the inner surfaces of the flanges to form the web or channel of the gutter.

The result, in the example given, using 2 x 4's as the initial material, is a standard commercially designated 4 x 5" gutter, which is actually $3\frac{5}{8}$" high x $4\frac{7}{8}$" wide.

FIG. 5 illustrates practice of the new method in the production of a larger size of gutter. In this case the blank 20 is the result of sawing in half, exactly as heretofore explained, an assembly made up of four 2 x 4's forming the flanges and one 3 x 4 sandwiched between them as the web. Two of the 2 x 4's are shown in FIG. 5 at 21, and the half of the 3 x 4 resulting from the sawing operation and forming the web or bottom of the blank 20 is designated 22. The actual dimensions of the dressed 3 x 4 are 2⅝" x 3⅝". Having been positioned in the assembly with its 2⅝" dimension forming the separation between the two flanges, i.e., constituting the bottom or web of the channel or trough blank 20, the piece 22 thus makes the spacing C of the two flanges of the blank 20 substantially 2⅝". This added to the thicknesses A and B, each of which is 1⅝", produces a trimmed gutter width of 5⅞". Thus the gutter, which like the first described size has a height of 3⅝", is of the standard commercial size called 4 x 6.

It will be obvious that larger sizes will be produced by selecting larger dimensioned component pieces to make up the initial assemblies.

It will be evident also that the production of all these different sized gutters is based on the use of individual lumber components which are much smaller in cross sectional area, and indeed in length also, than the final product. Thus the method possesses great advantages over the prior art method which was subject to the serious limitation of requiring a blank of single unitary lumber having a cross section larger than that of the final gutter product. This, of course, imposed a low limit on the sizes of wooden gutters that could be produced at any cost, and it made prohibitive the cost of wooden gutters in some of the larger sizes necessary for roofs of commercial buildings, churches and the like required to accommodate the water shed from roofs of great area.

One additional economy achieved by the new method results from the possibility of selecting less expensive grades of lumber for those portions of the gutter which are not exposed to view in the finished, installed product. Thus the pieces 4 and 3 in the FIG. 1 example of the invention, which become the rear flange of the gutter, might be selected from a sound, tight-knotted grade of lumber that is less costly than the clear grade that would be used for pieces 2 and 5 which become the front flanges of the gutter.

We claim:
1. A method of fabricating a pair of wooden gutters comprising the steps of bonding together a plurality of elongated pieces of lumber of rectangular cross section to form a three-layer assembly of H-shaped cross section comprising a relatively narrow web layer sandwiched centrally between two outer flange layers of mutually equal greater width, then cutting the assembly lengthwise centrally of the three layers to divide the assembly into two identical blanks of U-shaped cross section, each blank being a channel having a bottom formed of half of the web layer of the original assembly and having front and rear flanges each formed of half of one of the flange layers of the original assembly, and then milling said blanks to desired gutter shape.

2. A method of fabricating a pair of wooden gutters comprising the steps of adhesively bonding together a plurality of elongated pieces of lumber of rectangular cross section to form a three-layer assembly of H-shaped cross section comprising a relatively narrow web layer sandwiched centrally between two outer flange layers of mutually equal greater width, then cutting the assembly lengthwise centrally of the three layers to divide the assembly into two identical blanks of U-shaped cross section, each blank being a channel having a bottom formed of half of the web layer of the original assembly and having front and rear flanges each formed of half of one of the flange layers of the original assembly, and then milling the interior of each of said channels into a continuously curved surface of said channel bottom and flanges.

3. A method of fabricating wooden gutters comprising the steps of bonding together five elongated pieces of lumber of rectangular cross section to form a three-layer assembly of H-shaped cross section comprising a relatively narrow web layer formed by one of said pieces sandwiched centrally between two outer flange layers of mutually equal greater width each formed by two of said pieces set edge to edge, then cutting the assembly lengthwise in a plane central of the web layer and between the two pieces of each outer flange layer to divide the assembly into two identical blanks of U-shaped cross section, each blank being a channel having a bottom formed of half of the web layer of the original assembly and having front and rear flanges each formed of half of one of the outer flange layers of the original assembly, and then milling said blanks to desired gutter shape.

4. The method defined by claim 3 in which the five pieces are adhesively bonded together to form the assembly.

5. The method defined by claim 3 in which all five pieces are of identical dimensions.

6. The method defined by claim 3 in which all five pieces are of identical dimensions and are bonded together to form the assembly by adhesive spread on the engaged faces of the web and the outer flanges.

7. The method defined by claim 3 in which the assembled pieces of each outer flange layer are disposed with a narrow space between them.

8. The method defined by claim 3 in which the assembled pieces of each outer flange layer are disposed with an intervening space and the cutting operation comprises sawing the assembly by a cut of substantially the width of said space.

9. A method of fabricating a pair of wooden gutters comprising the steps of adhesively bonding together five elongated pieces of lumber, all of rectangular cross section and identical dimensions, to form a three-layer assembly of H-shaped cross section comprising a relatively narrow web layer formed by one of said pieces sandwiched centrally between two outer flange layers of mutually equal greater width each formed by two of said pieces set edge to edge with a narrow space intervening between them, then sawing the assembly lengthwise centrally of the three layers through the plane of the two narrow spaces to make in the web layer a saw cut of substantially the width of each of said narrow spaces and thus divide the assembly into two identical blanks of U-shaped cross section, each blank being a channel having a bottom formed of half of the web layer of the original assembly and having front and rear flanges each formed of half of one of the outer flange layers of the original assembly, and then milling the interior of each of said channels into a continuously curved surface of said channel bottom and flanges.

No references cited.

WILLIAM W. DYER, JR., *Primary Examiner.*

R. J. ZLOTNIK, *Assistant Examiner.*